United States Patent [19]

Kishi et al.

[11] Patent Number: 4,677,543

[45] Date of Patent: Jun. 30, 1987

[54] TRANSPORTABLE AND DETACHABLE DATA INPUT/OUTPUT UNIT PROVIDING AUTOMATIC CHARACTER INSERTION OR DELETION

[75] Inventors: Hajimu Kishi, Hino; Masaki Seki, Suginami; Yutaka Mizuno, Hachioji, all of Japan

[73] Assignee: Fanuc Ltd., Minamitsuru, Japan

[21] Appl. No.: 651,538

[22] PCT Filed: Oct. 14, 1983

[86] PCT No.: PCT/JP83/00351

§ 371 Date: Sep. 28, 1984

§ 102(e) Date: Sep. 28, 1984

[87] PCT Pub. No.: WO84/01643

PCT Pub. Date: Apr. 26, 1984

[30] Foreign Application Priority Data

Oct. 15, 1982 [JP] Japan .................................. 57-181085

[51] Int. Cl.⁴ ............................................. G06F 15/46
[52] U.S. Cl. ....................................... 364/191; 364/171
[58] Field of Search ..................... 364/171, 191, 518; 360/4; 234/96, 98, 100, 1, 2; 235/434, 442, 445, 489, 60.29; 178/111; 400/3, 4, 5, 6, 7, 64, 76

[56] References Cited

U.S. PATENT DOCUMENTS

| | | | |
|---|---|---|---|
| 3,482,215 | 12/1969 | Murayama | 340/172.5 |
| 3,975,712 | 8/1976 | Hepworth | 340/147 R |
| 3,979,732 | 9/1976 | Hepworth et al. | 364/200 |
| 4,044,328 | 8/1977 | Herff | 371/50 |
| 4,106,091 | 8/1978 | Hepworth et al. | 364/200 |
| 4,393,493 | 7/1983 | Edwards | 370/16 |
| 4,501,998 | 2/1985 | Nozawa et al. | 364/192 X |
| 4,509,139 | 4/1985 | Creager, Sr. | 364/900 |
| 4,587,608 | 5/1986 | Kishi et al. | 364/171 X |
| 4,591,968 | 5/1986 | Nozawa et al. | 364/191 X |

FOREIGN PATENT DOCUMENTS

| | | |
|---|---|---|
| 2812881 | 3/1973 | Fed. Rep. of Germany . |
| 879187 | 10/1961 | United Kingdom . |
| 1017967 | 1/1966 | United Kingdom . |
| 1062907 | 3/1967 | United Kingdom . |
| 1199510 | 7/1970 | United Kingdom . |

OTHER PUBLICATIONS

Furois et al., "Portable Inventory System and Method", IBM Technical Disclosure Bulletin, vol. 19, No. 5, Oct., 1976, p. 1828.

Primary Examiner—Gary V. Harkcom
Attorney, Agent, or Firm—Staas & Halsey

[57] ABSTRACT

A data input/output unit which is equipped with a control device (1), a tape puncher (5), a tape reader (4) and a printer (6), and which is capable of operating even in response to a common from a host computer. The tape puncher is provided with a discriminating circuit for discriminating line feed code data, such that when line feed code data are sensed by the data discriminating circuit, line feed code data and carriage return code data are delivered to a punching section so that the line feed code and carriage return code may be punched consecutively. Further, the tape puncher is provided with a data discriminating circuit for discriminating consecutive code data indicative of a line feed code and carriage return code. When the consecutive code data are sensed by the data discriminating circuit, only the line feed code data are delivered to the punching section in order to punch the line feed code.

4 Claims, 4 Drawing Figures

TRANSPORTABLE AND DETACHABLE DATA INPUT/OUTPUT UNIT PROVIDING AUTOMATIC CHARACTER INSERTION OR DELETION

CROSS REFERENCES TO RELATED APPLICATIONS

This application is related to U.S. application Ser. No. 651,996 now allowed.

BACKGROUND OF THE INVENTION

1. Field of the Invention

This invention relates to a transportable data input/output unit capable of being detached from the body of a numerical control device.

2. Description of the Related Art

In numerical control, there are cases where a host computer is used and made to perform a variety of data processing tasks to create command data for the machining of a workpiece. The data created by the host computer is recorded on a paper tape by a tape puncher and, with the paper tape serving as the recording medium, is used as input information for another system. In creating the paper tape, the contents of the tape are printed out by a printer in order to provide a record thereof beforehand. Where an output from the host computer is recorded on the paper tape or printed on recording paper, the paper tape puncher and printer used ordinarily are provided separately from the host computer body. These pieces of peripheral equipment are directly connected to the host computer and operate solely in response to commands therefrom. Unlike a system in which such peripheral equipment is of a disjointed nature, a system is conceivable in which the peripheral equipment operates on the basis of commands from a host computer when connected to the computer, but in which the contents of a paper tape may be read independently and printed for copying purposes when the peripheral equipment is disconnected from the host computer. However, a system such as this can be applied to only very limited systems and is inapplicable to others in certain aspects. Moreover, even where applicable, a disadvantage occurs in that results cannot be obtained unless the host computer software is modified. Furthermore, even if a paper tape format is adopted, two codes, namely "CR", "LF", have been used as the codes for carriage return and line feed operations in the past in accordance with the ISO codes, even though recently the carriage return and line feed have come to be implemented solely by the "LF" code. This means that even though a paper tape may be prepared using the same ISO standards, the tape cannot be used with both the old and new systems.

SUMMARY OF THE INVENTION

Accordingly, an object of the present invention is to provide a data input/output unit for a numerical control device in a numerical control system, which input/output unit is detachable from a host computer and includes a tape puncher, tape reader and printer combined into one, where the input output unit not only responds to commands from a host computer but is also capable of independently implementing a code conversion between "line feed" and "line feed-carriage return".

The present invention provides a processing function which not only enables a data input/output unit to operate in accordance with a command from a host computer in order to create a paper tape, print out transferred data and enter data, but which also enables the unit itself to be programmed independently to create a paper tape and print the data borne by the paper tape. A tape puncher is provided with a data discriminating circuit for discriminating line feed code data. The arrangement is such that when line feed code data are sensed by the data discriminating circuit, line feed code data and carriage return code data are delivered to a punching section to punch the line feed codes and carriage return codes consecutively. According to the present invention, it is possible to obtain a transportable data input/output unit capable of servicing several numerical control devices, and it is also possible to effect a simple changeover from a new system to an old system or from the old system to the new system with relation to "line feed" and "carriage return" data when creating or copying a paper tape.

DESCRIPTION OF THE PREFERRED EMBODIMENT

Figure 1:
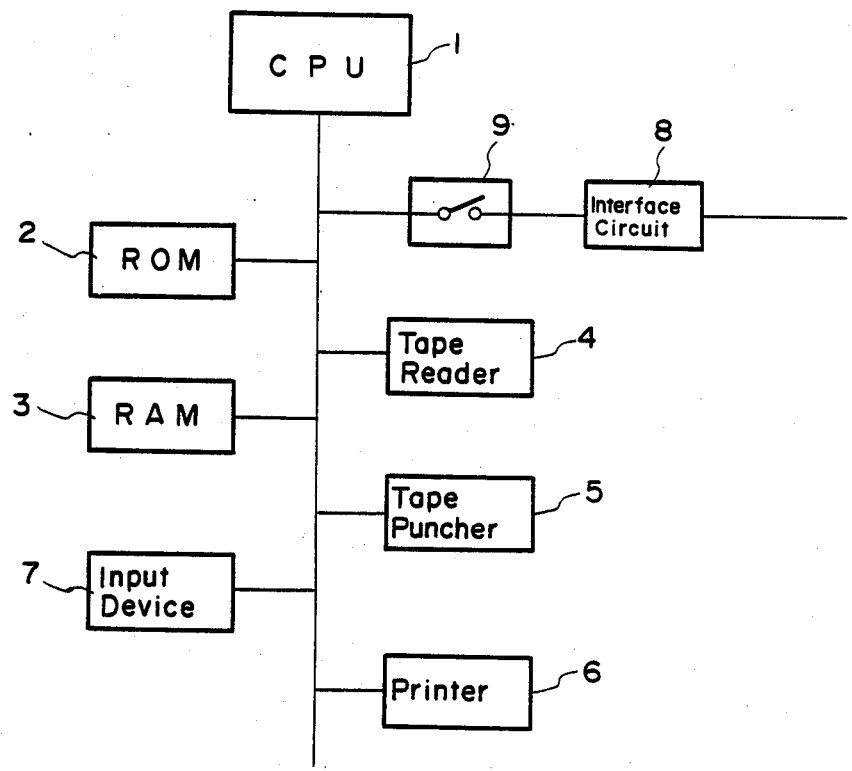
FIG. 1 is a block diagram of a data input/output unit according to the present invention.

An embodiment of the present invention will now be described in detail with reference to the drawings. FIG. 1 is a block diagram of a data input/output unit according to the present invention. In the Figure, numeral 1 denotes a control device or CPU, 2 a read-only memory (hereafter abbreviated to "ROM") storing a program necessary for operating the data input/output unit, 3 a random-access memory (hereafter abbreviated to "RAM") for temporarily storing data or the like read from a paper tape or the like, 4 a tape reader, 5 a tape puncher, and 6 a printer for printing data read by the tape reader, data punched by the tape puncher 5, or data received from a host computer. Numeral 7 denotes an operator's panel type input device having character keys, numeric keys, function keys and the like. In particular, the panel has an operation changeover switch for deciding whether operation is by a command from the host computer or whether the data input/output unit of the present invention is to operate independently. Numeral 8 is an interface circuit for interfacing to the host computer. Numeral 9 designates a changeover circuit.

The unit shown in FIG. 1 is capable of performing the following operations by itself. Specifically, data entered from the operator's panel 7 can be printed out immediately by the printer and the data can be stored in the RAM 3. In addition, after the results of the print-out are checked, errors in the data stored in the RAM 3 can be corrected. After the correction operation, the data stored in the RAM 3 can be printed out and punched in a paper tape as well. Furthermore, data read from the tape reader 4 can be printed out by the printer 6 and punched in a paper tape by the tape puncher 5 to create a copy of the paper tape. These operations can be performed simultaneously.

The unit shown in FIG. 1 can be connected to a host computer by turning on the changeover circuit 9 through manipulation of the operation changeover switch provided on the operator's panel 7, and data can be transferred from the operator's panel 7 or tape reader 4 to the host computer through the RAM 3 or by-passing the RAM. In addition, data transferred from the host computer can be recorded on a paper tape by the tape puncher 5, and the data can also be printed out by the printer 6.

Figure 2:
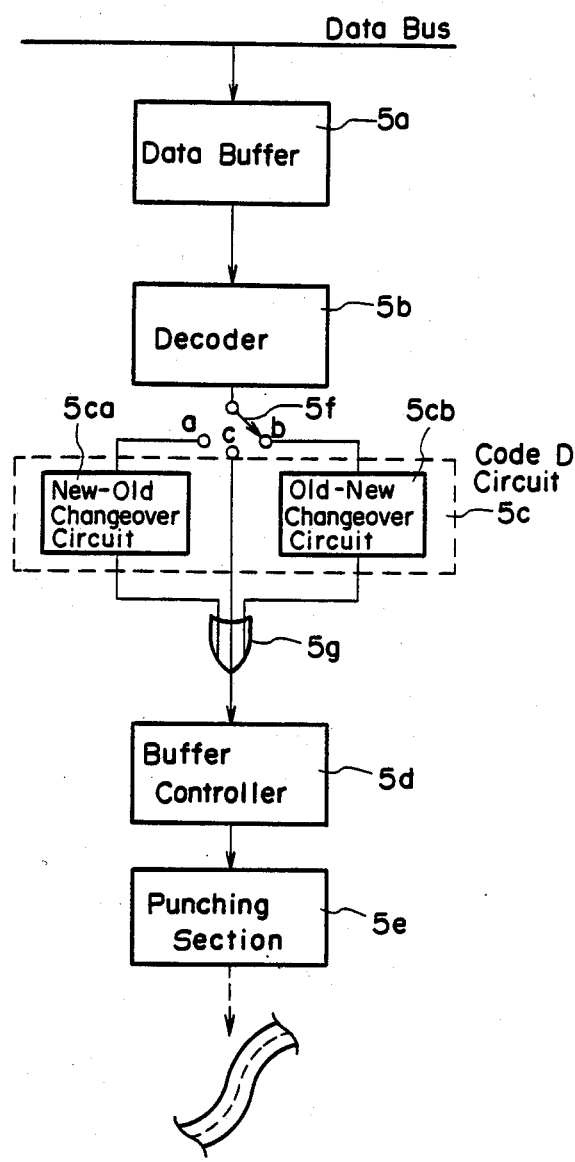
FIG. 2 is a block diagram showing the components of a tape puncher.

FIG. 2 is a block diagram showing the constitution of the tape puncher 5. In the Figure, numeral 5a denotes a data buffer, 5b a decoder for decoding a print instruction, and 5c a code discriminating circuit, within which numeral 5ca designates a new-to-old changeover circuit and numeral 5cb an old-to-new changeover circuit. The decoder 5b and code discriminating circuit 5c construct a data discriminating circuit. Numeral 5d denotes a puncher control circuit, 5e a punching section, 5f a changeover switch, and 5g an OR circuit.

Figure 3:
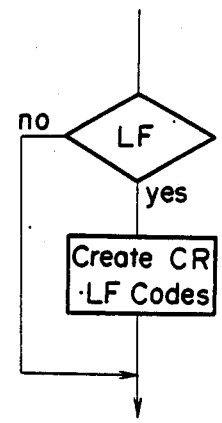
FIGS. 3 and 4 are block diagrams illustrating operation of a code discriminating circuit.

Next, in connection with the operation of the tape puncher 5 shown in FIG. 2, a case will be described in which a paper tape based on the old system is created from data based on the new system. The changeover switch 5f is switched over to the a side. Print data which enters the data buffer 5a from the data bus is applied to the new-to-old changeover circuit 5ca of the code discriminating circuit 5c through the decoder 5b. The new-to-old changeover circuit 5ca of the code discriminating circuit 5c discriminates whether the print data is the "line feed" (LF) code, as shown in FIG. 3. If the data is the "line feed" (LF) code, the code "CD·LF" is created in the next step, and this data is delivered to the puncher controller 5d through the OR circuit. The code "CR·LF" is punched into a paper tape in the punching section 5e. For codes other than the "line feed" (LF) code, these codes are delivered directly to the puncher controller 5d so that an ordinary punching operation may be performed in the punching section 5e.

Figure 4:
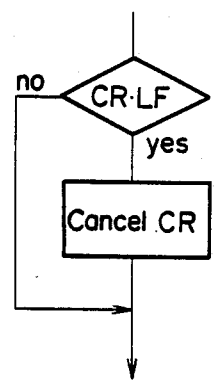

Described next will be a case where a paper tape based on the new system is created from data based on the old system. The changeover switch 5f is switched over to the b side. Print data which enters the data buffer 5a from the data bus is applied to the old-to-new changeover circuit 5cb of the code discriminating circuit 5c through the decoder 5b. The old-to-new changeover circuit 5cb of the code discriminating circuit 5c discriminates whether the print data are the consecutive codes for "carriage return" (CR) and "line feed" (LF), as shown in FIG. 4. If the data are the consecutive codes "carriage return" (CR) and "line feed" (LF), then the code "CR" is cancelled in the next step and only the code "LF" is delivered to the puncher controller 5d through the OR circuit. The code "LF" is punched into a paper tape in the punching section 5e. For codes other than the "line feed" (LF) code, these codes are delivered directly to the puncher controller 5d so that an ordinary punching operation may be performed in the punching section 5e. In a case where the data are not to be treated in the foregoing manner, the changeover switch 5f is switched over to the c side and data from the decoder 5 is delivered to the puncher controller 5d through the changeover switch 5f.

The changeover switch 5f can be manipulated at the operator's panel 7, by a separate manual switch provided at a suitable location, or in response to a command from a host computer. In the above-described embodiment, the new-old and old-new conversion is performed by the code discriminating circuit 5c. Alternatively, however, the code discriminating circuit 5c can be provided with a changeover circuit solely for the new-old or old-new changeover to effect a conversion only in one direction.

As described in detail above, the present invention is equipped with a processing function which not only enables a data input/output unit to operate in accordance with a command from a host computer in order to create a paper tape, print out transferred data and enter data, but which also enables the unit itself to be programmed independently to create a paper tape and print the data borne by the paper tape. The present invention therefore serves well as a transportable data input/output unit capable of servicing several numerical control devices. Furthermore, when creating or copying a paper tape, the changeover from a new system to an old or from the old system to the new in connection with "line feed" and "carriage return" data can be carried out in a simple manner. The invention is therefore highly advantageous in terms of paper tape creation.

According to the present invention, there can be obtained a data input/output unit which is detachable from a host computer and which is capable of effecting a changeover between new and old systems in a simple manner with regard to "line feed" and "carriage return" data when creating or copying a paper tape. The present invention therefore serves well as a transportable data input/output unit capable of servicing several numerical control devices.

We claim:

1. A data input/output unit capable of being connected to a host computer and an auxiliary memory device, comprising:
    a control device operatively connectable to the host computer and the auxiliary memory device;
    a read-only memory, operatively connected to said control device, for storing a program necessary for operation of said data input/output unit;
    a random-access memory, operatively connected to said control device, for temporarily storing data read from the auxiliary memory device;
    a tape reader, operatively connected to said control device, for reading data contained by a tape; and
    a tape puncher, operatively connected to said control device, for punching data into a paper tape, said tape puncher including:
        a data discriminating and selection circuit, operatively connected to said control device, for discriminating line feed code data and providing a first selection, and for discriminating consecutive code data indicative of line feed code data and carriage return code data and providing a second selection;
        insertion means, operatively connected to said data discriminating and selection circuit upon said first selection, for controlling consecutive punching of line feed code data and carriage return code data when line feed code data is sensed by said data discriminating circuit; and
        deletion means, operatively connected to said data discriminating and selection circuit upon said second selection, for cancelling carriage return code data and punching solely line feed code data when said consecutive code data are sensed by said data discriminating and selection circuit, where either said insertion or deletion means is active at any one time.

2. A data input/output unit as recited in claim 1, wherein said data input/output unit further comprises switch means, operatively connected to said control device, said insertion means and said deletion means, for switching between said insertion means and said deletion means.

3. A data input/output unit connectable to a host computer, said unit comprising:
   a tape puncher;
   insertion means, operatively connectable to the host computer and operatively connected to said tape puncher, for converting line feed data into line feed data and carriage return data;
   deletion means, operatively connectable to the host computer and operatively connected to said tape puncher, for converting line feed and carriage return data into line feed data; and
   discrimination and selection means, operatively connectable to the host computer and connected to said insertion means and said deletion means, for discriminating line feed code data and selecting insertion means and for discriminating consecutive line feed and carriage return code data and selecting said deletion means.

4. A unit as recited in claim 3, wherein only one of said insertion or deletion means is activatable by a command from the host computer at any one time.

* * * * *

UNITED STATES PATENT AND TRADEMARK OFFICE
CERTIFICATE OF CORRECTION

PATENT NO. : 4,677,543

DATED : June 30, 1987

INVENTOR(S) : Hajimu Kishi, Masaki Seki and Yutaka Mizuno

It is certified that error appears in the above-identified patent and that said Letters Patent is hereby corrected as shown below:

Col. 1, line 61, "input output" s/b --input/output--;
Col. 2, line 66, "the" s/b --an--;
Col. 6, line 6, after "selecting" insert --said--.

Signed and Sealed this

Fifteenth Day of March, 1988

Attest:

DONALD J. QUIGG

*Attesting Officer*  *Commissioner of Patents and Trademarks*